US008559316B2

United States Patent
Newman

(10) Patent No.: US 8,559,316 B2
(45) Date of Patent: Oct. 15, 2013

(54) METHOD AND SYSTEM TO APPLY TREATMENTS TO DIFFERENT CHANNELS

(75) Inventor: Kurt Newman, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 2510 days.

(21) Appl. No.: 10/605,242

(22) Filed: Sep. 17, 2003

(65) Prior Publication Data
US 2005/0058074 A1    Mar. 17, 2005

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G06Q 30/00 | (2012.01) |

(52) U.S. Cl.
USPC .................. 370/241; 705/14.41; 705/14.42

(58) Field of Classification Search
USPC ........................................... 705/1–28
See application file for complete search history.

(56) References Cited

U.S. PATENT DOCUMENTS 6,934,748 B1 * 8/2005 Louviere et al. .............. 709/224

OTHER PUBLICATIONS

"Practical Reliability Engineering" (by Patrick D.T. O'Connor, David Newton, Richard Bromley. John Wiley and Sons, 2002. pp. 140-144.*

* cited by examiner

Primary Examiner — William A Brandenburg
(74) Attorney, Agent, or Firm — Michael A. Springs; Moore & Van Allen PLLC; Padowithz Alce

(57) ABSTRACT

A method to apply different treatments may include defining at least one treatment and selecting at least one channel. The method further may include applying the at least one treatment to the at least one selected channel.

41 Claims, 14 Drawing Sheets

| Test Groups In Previous Matrix | Mapping/Mapping Path | | Mapping Path | | Channel | |
|---|---|---|---|---|---|---|
| Test Group X | Mapping 502 | | | 508 | | 506 |
| | 50 | %Test Group A | Conservative Random | | Internet Site | |
| | 30 | %Test Group B | Complete Random | | (None) | |
| | 20 | %Test Group C | Complete Random | | (None) | |
| Test Group Y | Mapping | | Mapping Path | | Channel | |
| | 10 | %Test Group A | Conservative Random | | Internet Site | |
| | 80 | %Test Group B | Conservative Random | | (None) | |
| | 10 | %Test Group C | Complete Random | | (None) | |
| Test Group Z | Mapping | | Mapping Path | | Channel | |
| | 50 | %Test Group A | Conservative Random | | (None) | |
| | 10 | %Test Group B | Complete Random | | (None) | |
| | 40 | %Test Group C | Complete Random | | (None) | |
| Default Group | Mapping | | Mapping Path | | Channel | |
| | 70 | %Test Group A | Conservative Random | | (None) | |
| | 25 | %Test Group B | Complete Random | | (None) | |
| | 5 | %Test Group C | Complete Random | | (None) | |

500

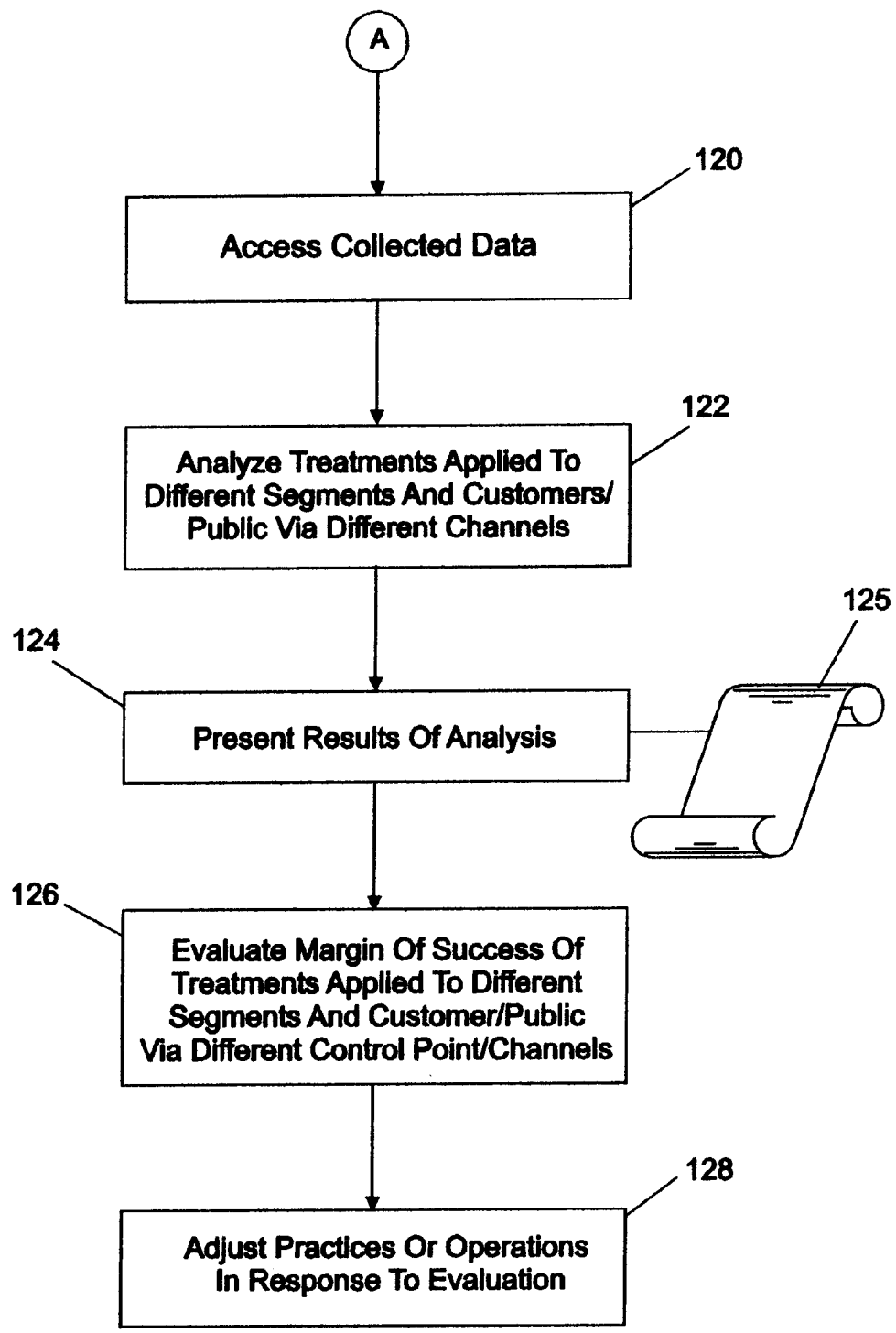

FIG. 2

| | Segments | | |
|---|---|---|---|
| Channels | Segment 01 | Segment 02 | Segment 03 |
| Channel 01 WebSite | Test Group A<br>CP-A / TRMT-A0 / TRMT-A1<br>CP-B / TRMT-B0 / TRMT-B1<br>CP-C / TRMT-C0 / TRMT-C1 | Test Group B<br>CP-A / TRMT-A2 / TRMT-A3<br>CP-B / TRMT-B2 / TRMT-B3<br>CP-C / TRMT-C2 / TRMT-C3 | Test Group C<br>CP-A / TRMT-A4 / TRMT-A5<br>CP-B / TRMT-B4 / TRMT-B5<br>CP-C / TRMT-C4 / TRMT-C5 |
| Channel 02 E.Mail | Test Group D<br>CP-A / TRMT-A0 / TRMT-A2<br>CP-B / TRMT-B0 / TRMT-B2<br>CP-C / TRMT-C0 / TRMT-C2 | Test Group E<br>CP-A / TRMT-A0 / TRMT-A3<br>CP-B / TRMT-B0 / TRMT-B3<br>CP-C / TRMT-C0 / TRMT-C3 | Test Group F<br>CP-A / TRMT-A0 / TRMT-A4<br>CP-B / TRMT-B0 / TRMT-B4<br>CP-C / TRMT-C0 / TRMT-C4 |
| Channel 03 Direct Mail | Test Group G<br>CP-A / TRMT-A1 / TRMT-A3<br>CP-B / TRMT-B1 / TRMT-B3 | Test Group H<br>CP-A / TRMT-A1 / TRMT-A4<br>CP-B / TRMT-B1 / TRMT-B4 | Test Group I<br>CP-A / TRMT-A1 / TRMT-A5<br>CP-B / TRMT-B1 / TRMT-B5 |

FIG. 5

| Test Groups In Previous Matrix | Mapping/Mapping Path | | | | |
|---|---|---|---|---|---|
| | Mapping — 502 | | Mapping Path — 508 | Channel — 506 | |
| Test Group X | %Test Group A | 50 | Conservative Random | Internet Site | |
| | %Test Group B | 30 | Complete Random | (None) | |
| | %Test Group C | 20 | Complete Random | (None) | |
| Test Group Y | Mapping | | Mapping Path | Channel | |
| | %Test Group A | 10 | Conservative Random | Internet Site | |
| | %Test Group B | 80 | Complete Random | (None) | |
| | %Test Group C | 10 | Complete Random | (None) | |
| Test Group Z | Mapping | | Mapping Path | Channel | |
| | %Test Group A | 50 | Conservative Random | (None) | |
| | %Test Group B | 10 | Complete Random | (None) | |
| | %Test Group C | 40 | Complete Random | (None) | |
| Default Group | Mapping | | Mapping Path | Channel | |
| | %Test Group A | 70 | Conservative Random | (None) | |
| | %Test Group B | 25 | Complete Random | (None) | |
| | %Test Group C | 5 | Complete Random | (None) | |

500

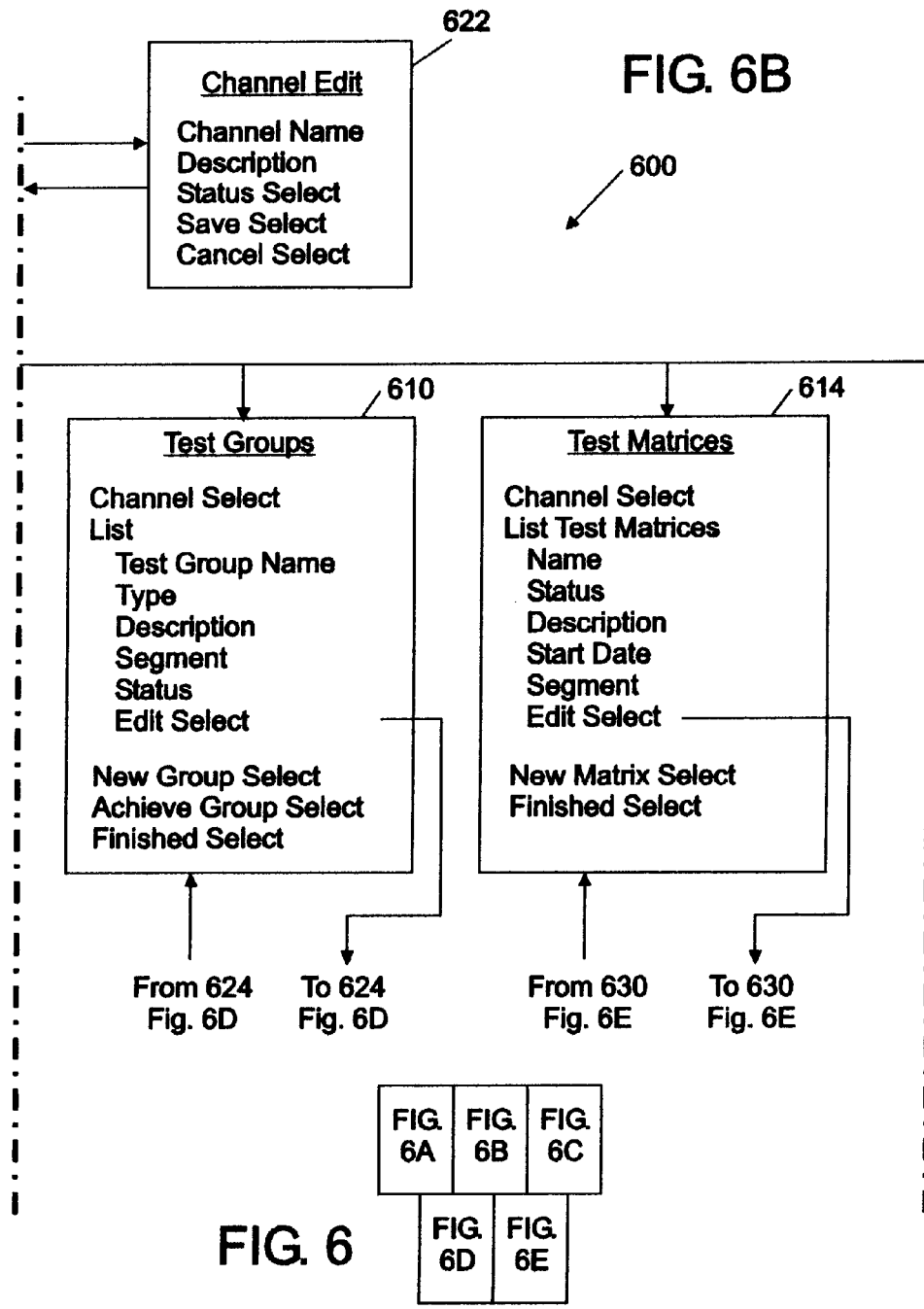

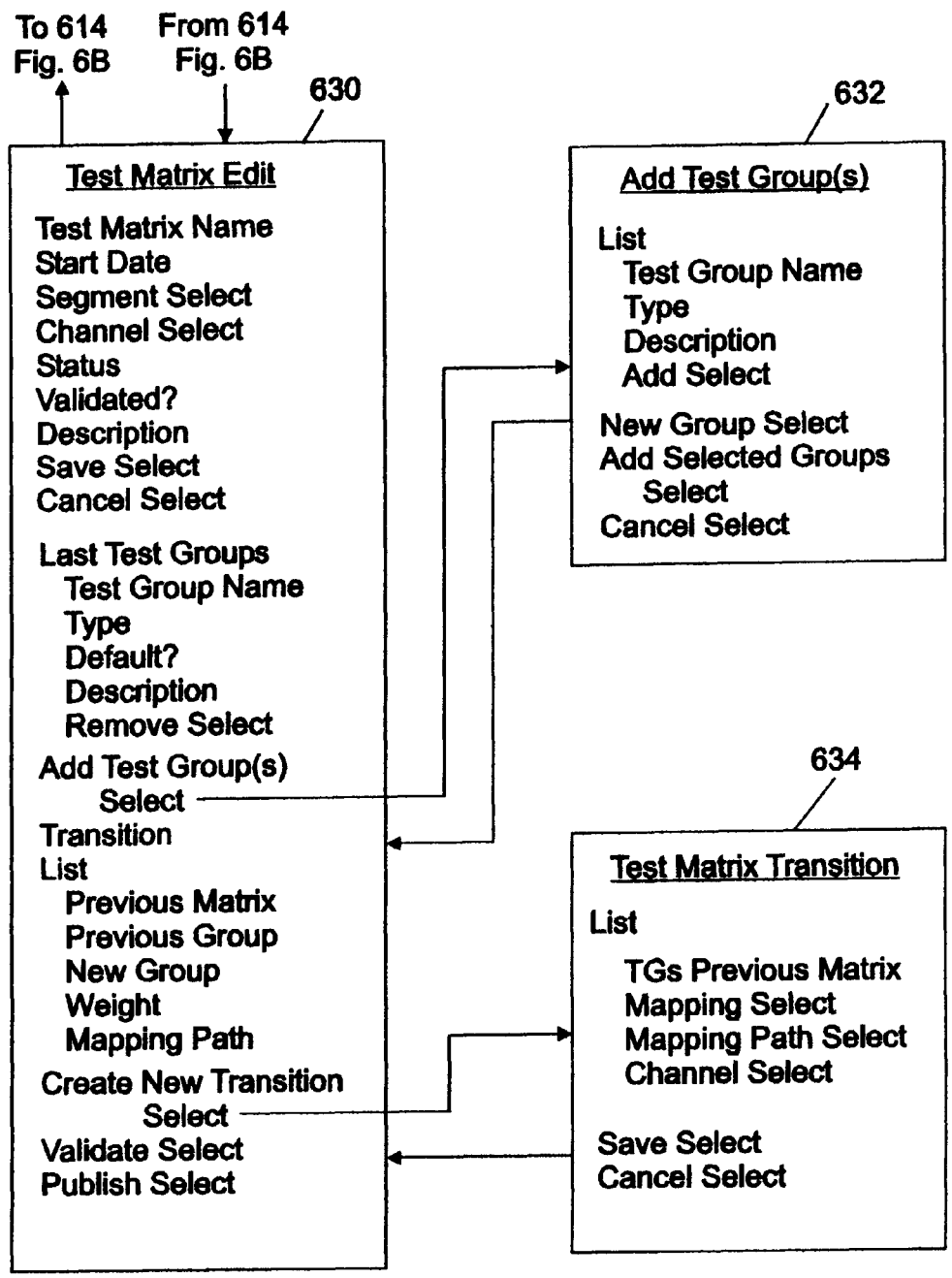

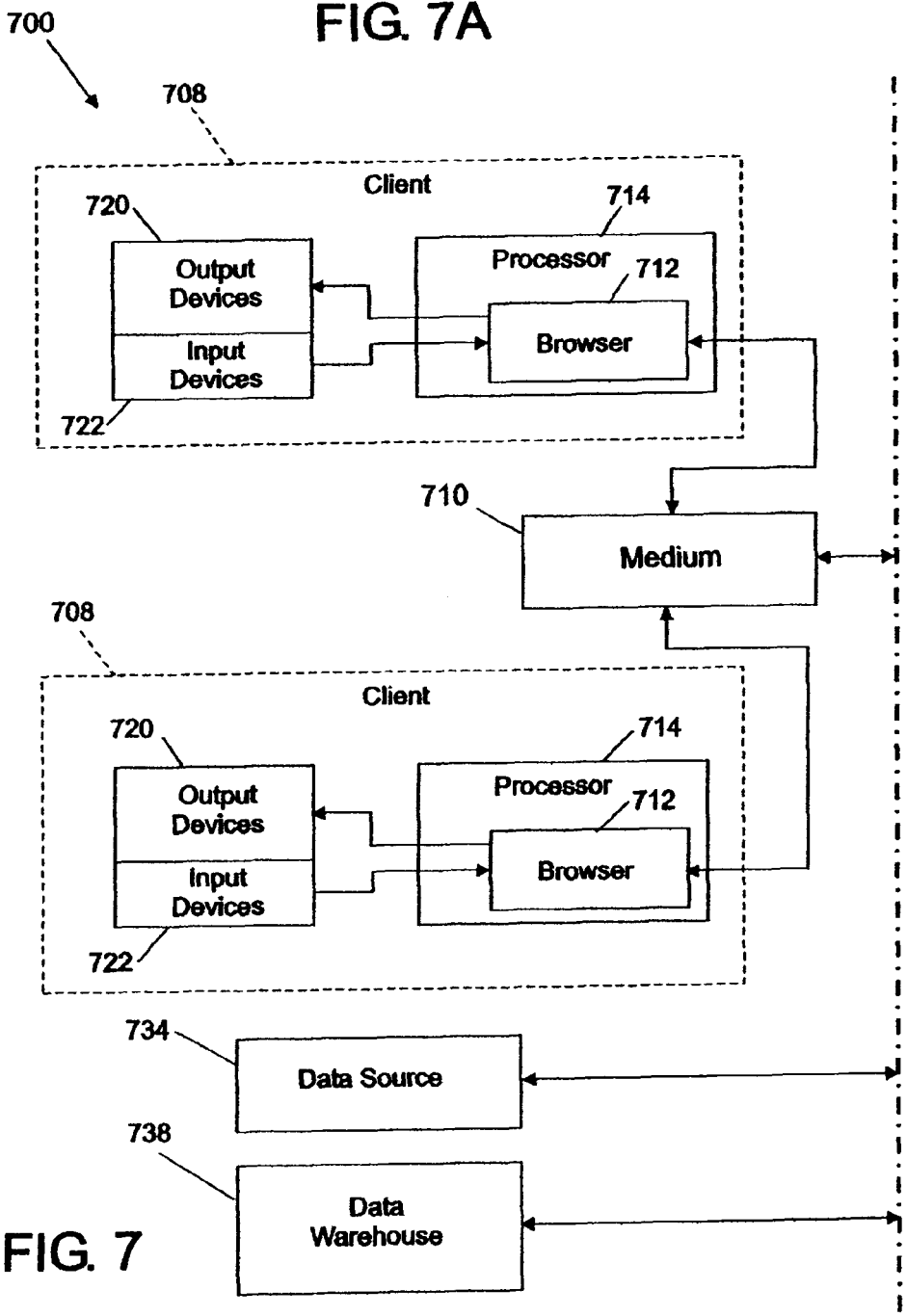

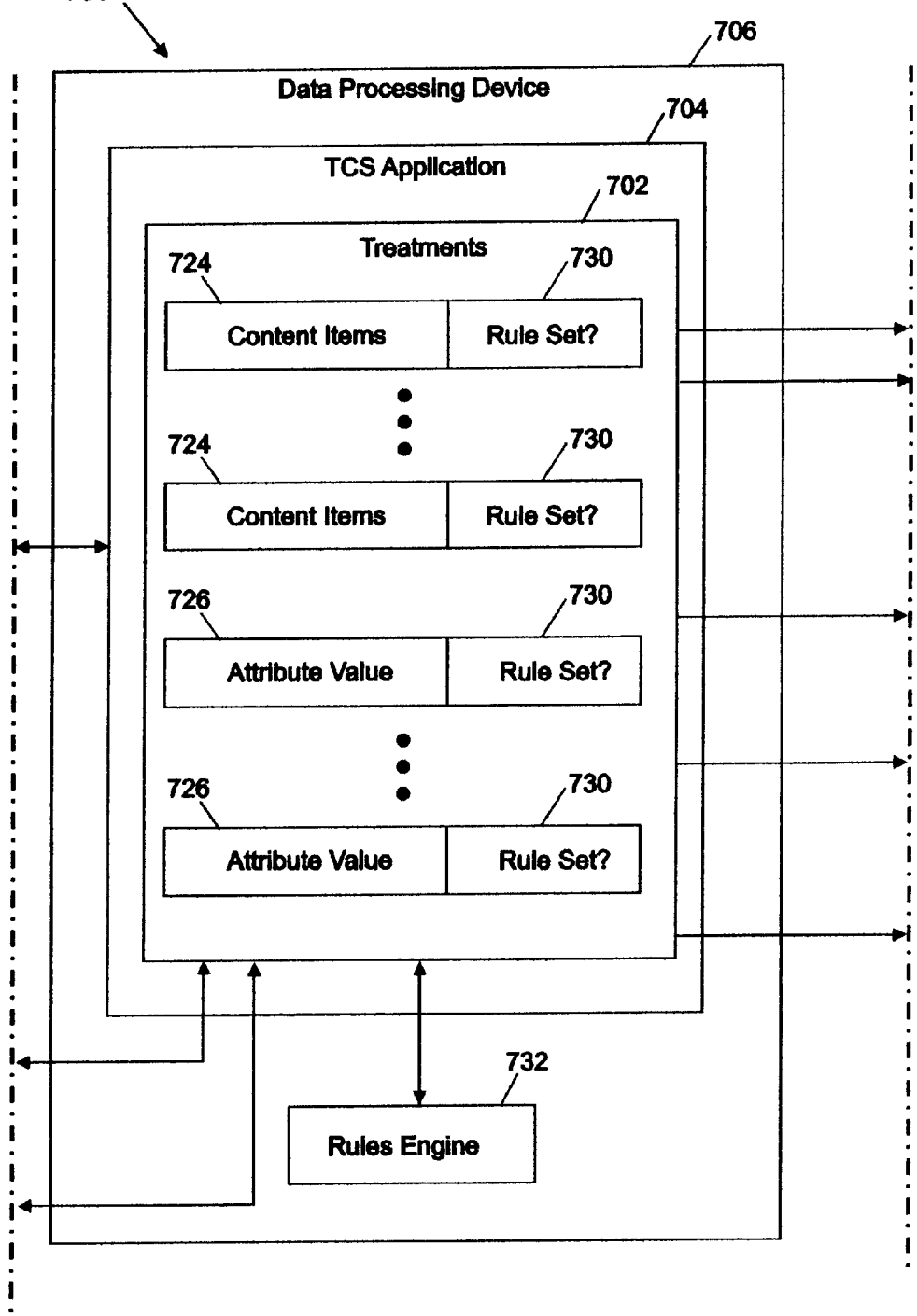

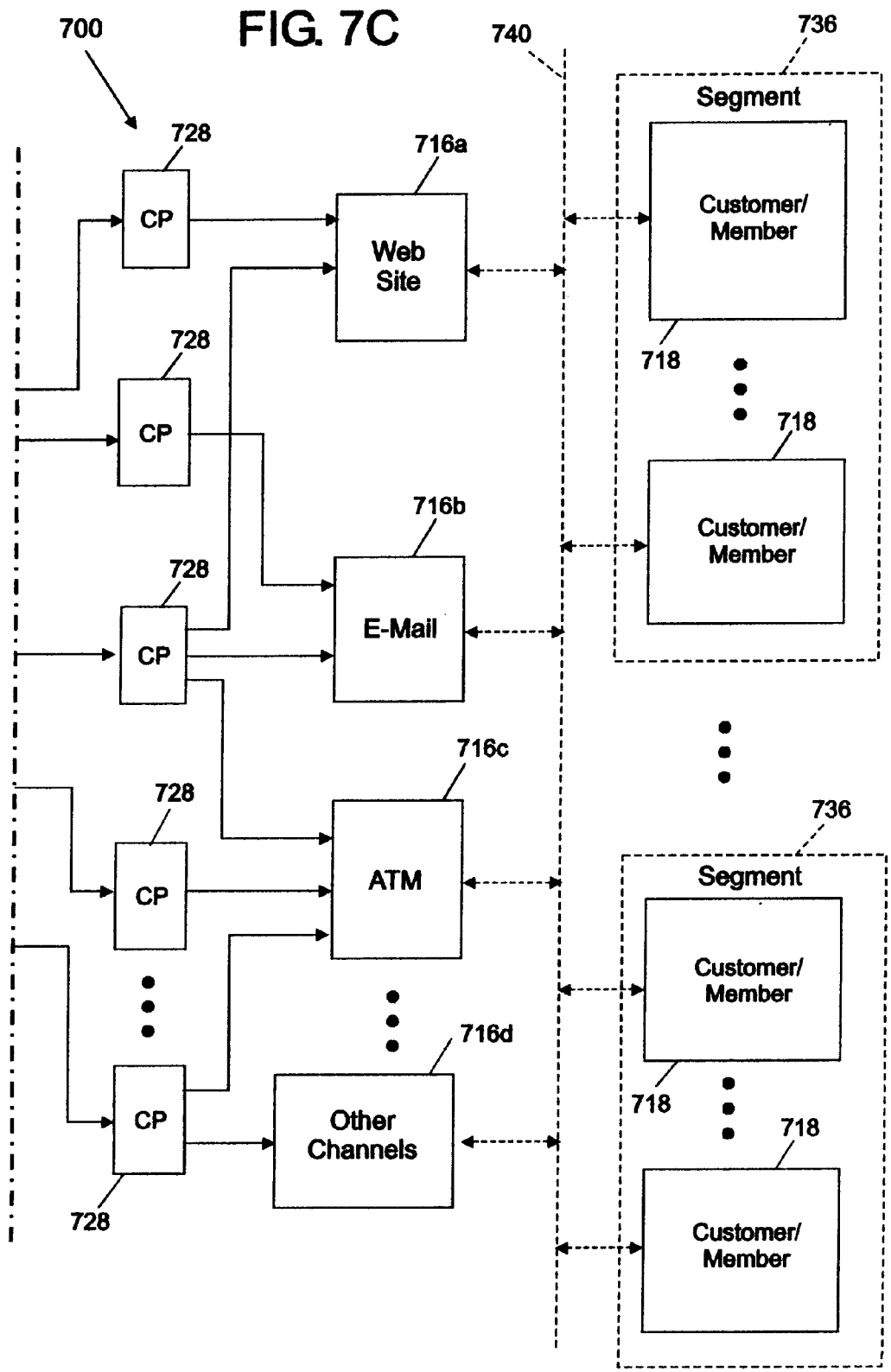

METHOD AND SYSTEM TO APPLY TREATMENTS TO DIFFERENT CHANNELS

BACKGROUND OF INVENTION

The present invention relates to an entity's or business's appearance via different channels or points of contact with customers or others, and more particularly to a method and system to apply different treatments to different channels or points of contact or channels for testing the treatments or for other purposes.

The manner in which an entity, such as a business, organization or the like, presents itself to customers, potential customers, members, potential members and the public can be very important. Such entities may have multiple different points of contact or channels of communication with customers, members and the public. Many of the channels or points of contact may be electronic or involve electronic media, such as the Internet, e-mail, on-hold telephone messages, outbound telemarketing, electronic kiosks, vending machines, automatic teller machines ATMs and the like. Other channels or points of contact may include direct mail, statement inserts and other channels of contact or communication. Treatments, such as look and feel, audio, visual or combination audio-visual effects that a customer, member or public experiences via each of the different channels can influence an individual's impressions of an entity and may influence an individual in making decisions, such as buying a product, joining an organization, doing business with an entity or the like.

A lack of coordination or incongruities between treatments among different channels may send inconsistent messages or different inferences may be drawn that can lead to confusion and misunderstanding. Additionally, different treatments may affect some individuals differently from others and it may be important to characterize individuals in different groups or segments for application of different treatments. Understanding an impact of different treatments via different media may be critical before applying universally or to a significant number of customers.

SUMMARY OF INVENTION

In accordance with an embodiment of the present invention, a method to apply different treatments may include defining at least one treatment and selecting at least one channel. The method may additionally include applying the at least one treatment to the at least one selected channel. The results responsive to applying the at least one treatment to the at least one selected channel may also be evaluated.

In accordance with another embodiment of the present invention, a method to apply different treatments may include accessing historical data related to treatments from a data source and evaluating a margin of success or failure of each treatment applied to different segments via different channels. The method may also include adjusting practices or operations based on results of the evaluation.

In accordance with another embodiment of the present invention, a system to apply different treatments may include a server and a test control system operating on the server to apply each treatment selected from a plurality of treatments to a chosen channel.

In accordance with another embodiment of the present invention, a computer-readable medium having computer-executable instructions for performing a method may include defining at least one treatment and selecting at least one channel. The method may further include applying the at least one treatment to the at least one selected channel.

In accordance with another embodiment of the present invention, a method of making a system to apply different treatments may include providing a server and providing a test control system operating on the server to apply each treatment selected from a plurality of treatments to a chosen channel.

BRIEF DESCRIPTION OF DRAWINGS

FIGS. 1A and 1B (collectively FIG. 1) are a flow chart of an exemplary method to apply treatments in accordance with an embodiment of the present invention.

FIG. 2 is an example of a configuration for channels, segments and test groups in accordance with an embodiment of the present invention.

FIG. 5 is an example of a graphical user interface (GUI) that may be used to define a transition between a current matrix and a new matrix in accordance with an embodiment of the present invention.

FIGS. 6A, 6B, 6C, 6D and 6E (collectively FIG. 6) are a flow chart illustrating examples of web pages or graphical user interfaces (GUIs) to apply treatments or to test treatments in accordance with an embodiment of the present invention.

FIGS. 7A, 7B and 7C (collectively FIG. 7) are an example of a system to apply treatments or to test treatments in accordance with an embodiment of the present invention.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1A:
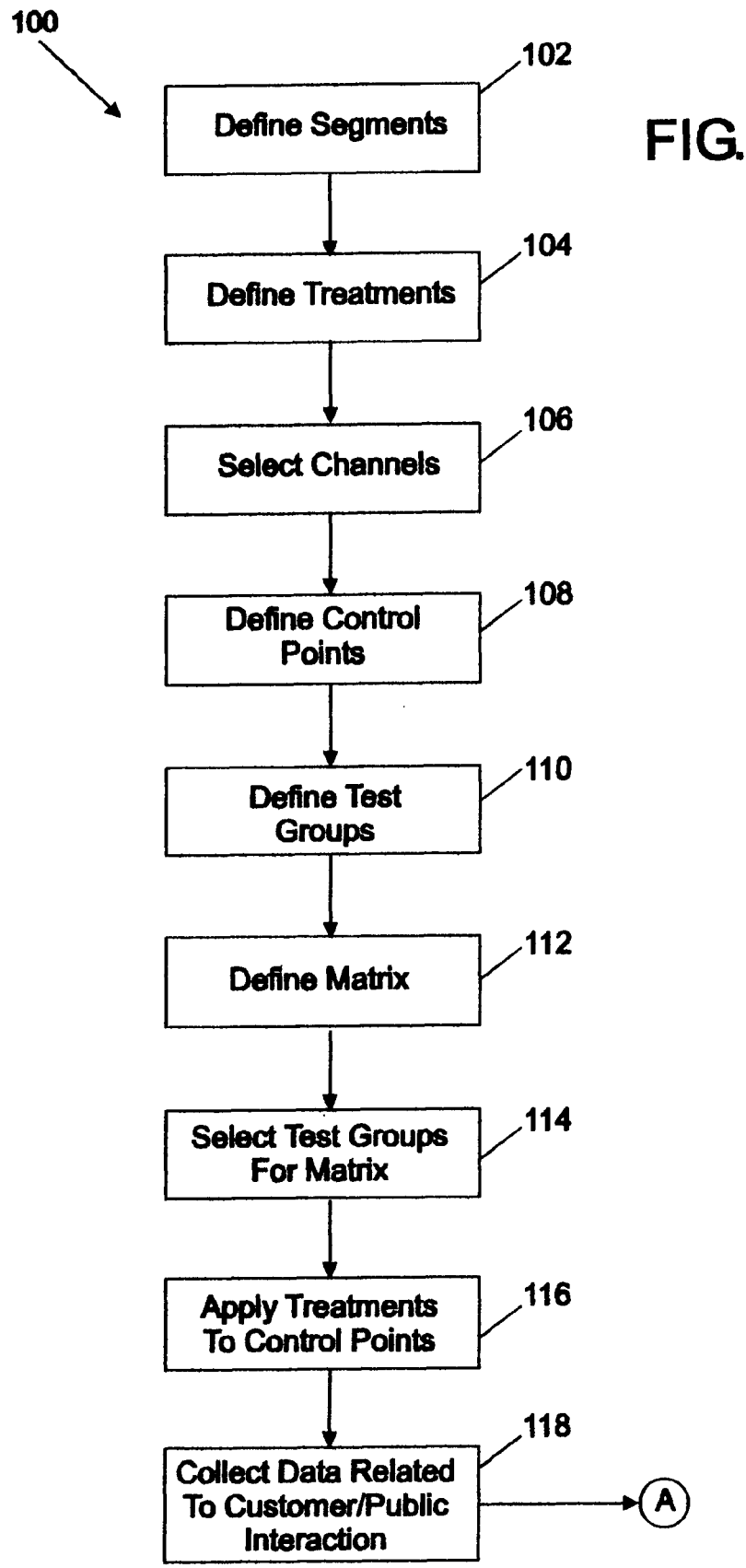

FIGS. 1A and 1B are a flow chart of a method 100 to apply treatments in accordance with an embodiment of the present invention. In block 102, segments may be defined. Segments may refer to different groups of individuals, such as for example customers, organization members, the general public or the like. Individuals may be segmented by predetermined criteria. Examples of such criteria may include but are not limited to behaviors, habits, attitudes, services used, service levels, products purchased, subscriptions, degree and nature of contacts with the entity and the like. Communications or contacts can be targeted to specific segments for differentiated services or products. Segments may be defined by name, description, status and criteria used to assign an individual or customer to a segment.

In block 104, treatments may be defined. Treatments may refer to the aspects of communication or contact with individuals that may be applied to different communication channels or contact medium for testing an impact or for other purposes. Examples of treatments that may be applied may include images, message text, message format, sound bites, male or female voices, tone, look and feel, colors, layout or the like. Treatments may also involve a method to select an image, message text, format or any of the above. A treatment may be associated with more than one channel to enable coordination of treatments across channels. There may be two types of treatments, content items and attribute values. A content item may be an image, text, sound bite or the like that if selected may be directly applied to the channel. An attribute value may be used by some predefined criteria, algorithm, logic statement or the like, to select the content to be presented or applied. A treatment may also be flagged as a rule set. A treatment that is flagged as a rule set may identify a specific conditional logic statement that may be executed to identify the content item or attribute value that may be applied or presented. As described in more detail hereinafter, a rules engine may be included to perform or implement conditional logic. A treatment may be defined by a name, description, status, type, control point where the treatment may be applied and the like. A treatment may also be defined by an identifying code that may be used by a channel to identify a specific treatment.

In block 106, channels may be selected for applying the treatments. A channel may refer to a specific means or medium of communication. Examples of channels may include a web site, email, direct mail, on-hold telephone messages, outbound telemarketing, statement inserts or messages, ATM messages or screens and the like. Any channel that has dynamic content capabilities and is able to evaluate a specific code to select content to present or display may be used to coordinate contacts across multiple channels. A channel may be defined by a name, description, status and the like.

In block 108, control points may be defined or selected. Control points may refer to virtual or physical locations associated with each channel where various aspects of communications with customers, members, the public or the like may be applied and tested by presenting different treatments to different customers. Control points may be associated with more than one channel to enable coordination across different channels. There may be two types of control points. A content control point may expect or require a content value or content treatment. An attribute value control point may expect or require an attribute treatment or an attribute value that may be used by some criteria to select a content to present as previously described. A control point may be defined by a name, description, status, type, channel with which the control point is associated and an identifying code that may be used by the channel to match the control point to a specific dynamic element. Examples of control points may include, background for a web page, ATM screen, kiosk or the like, positioning of elements on a web page, ATM screen, electronic kiosk or the like, where and when to apply animation effects, audio, images, textual materials or the like.

In block 110, test groups may be defined. Test groups may identify different groups of customers, members, demographic groups of the public or the like or different experiments or application packages across channels that may be created and executed or applied by assigning a treatment for every control point in each appropriate channel for every customer, member, demographic group of the public or the like. A collection of treatments assigned to a customer, member, segment or the like may be referred to as a cell or test cell.

Referring also to FIG. 2, FIG. 2 is an example of a configuration 200 for channels 202, segments 204 and test groups 206 in accordance with an embodiment of the present invention. One or more treatments (TRMT) 208 may be applied at each control point (CP) 210 for each channel 202. Different treatments 208 may be applied to each control points 210 for the different segments 204 and the treatments 208 between the different channels 210 for a segment 204 may be coordinated to present unified and consistent contacts with the customers, members or the like in each segment 204. A test group 206 may be defined by a name, description, status, type, segment 204, and channel 202 to be associated with the test group 206.

Figure 3:
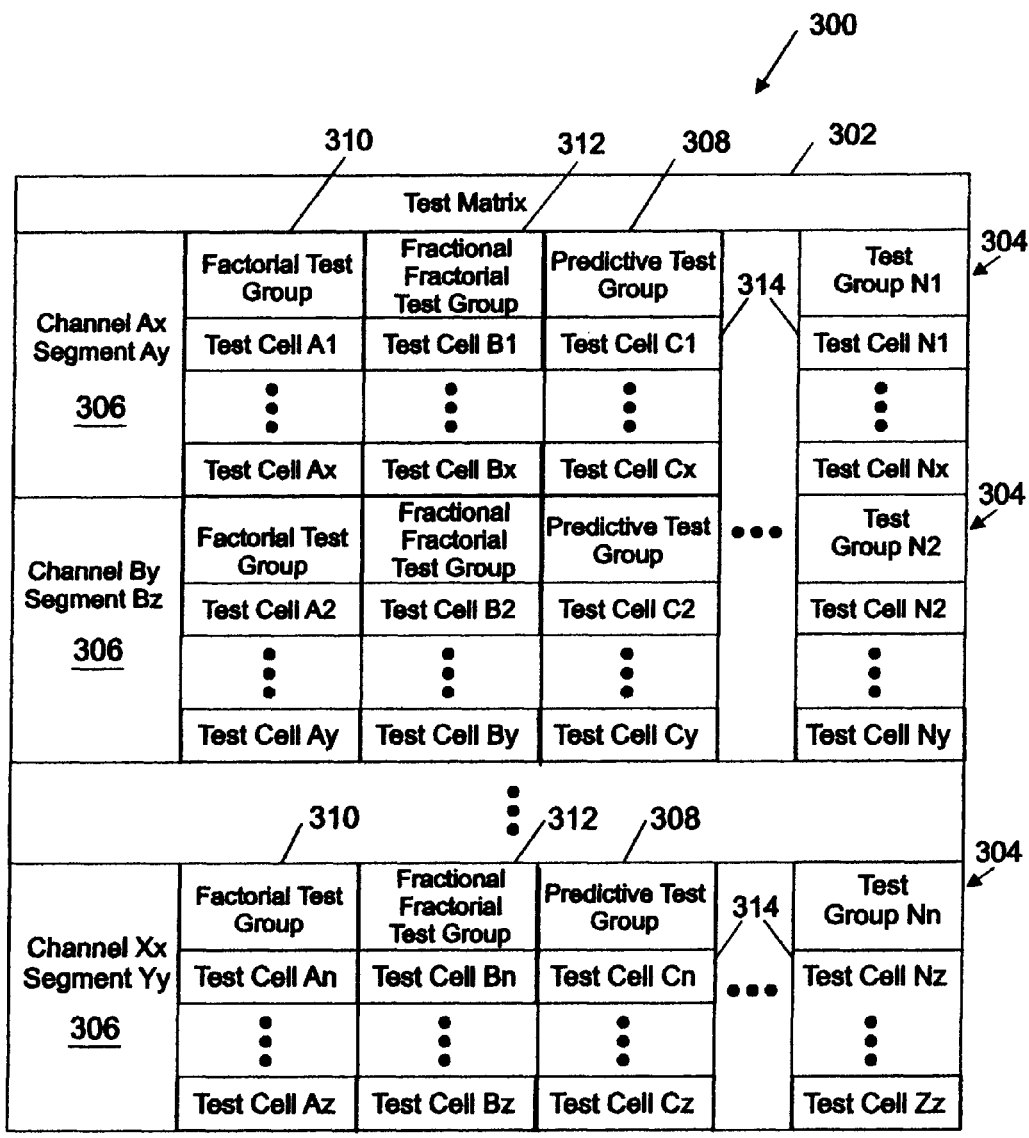
FIG. 3 is an example of a configuration for a test matrix in accordance with an embodiment of the present invention.

Referring back to FIG. 1A, a matrix or test matrix may be defined in block 112. An example of a configuration 300 for a test matrix 302 is illustrated in FIG. 3. The matrix 302 may refer to a collection of test groups 304 (or 206 in FIG. 2) that may be associated with a specific channel and segment 306 (or channel 202 and segment 204 in FIG. 2). Each channel and segment pair 306 may be associated with one or more test groups 304. Each test group 304 may be one of a predictive test group 308, a fractional test group 310 or a fractional factorial type test group 312. The test matrix 302 may include a mixture of predictive test groups 308, fractional test groups 310 or fractional factorial type test groups 312. Each test group 308-312 may be a specific experiment and test matrix 302 may have multiple experiments that may be executed simultaneously. Each test group 308-312 may include one or more test cells 314. As previously discussed, a test cell 314 may be defined as the collection of treatments 208 (FIG. 2) applied to each customer or the like.

A test cell 314 for customers or the like in the predictive test group 308 may be defined by a process that evaluates predictive scores to identify treatments 208 (FIG. 2) that may be applied for each customer. Examples of the predictive test group 308 may include specific treatments 208 assigned to specific customers using statistical analysis and/or predictive scores. Accordingly, treatments 208 applied to customers in the predictive test group 308 are selected in a predetermined manner and are not selected randomly.

A test cell 314 for customers or the like in the factorial test group 310 may be randomly created and may include all possible combinations of control points 210 (FIG. 2) and treatments 208 that may be configured for use. When creating the factorial test group 310, specific test cells 314 may be excluded so specific combinations of treatments 208 will not be assigned to customers or the like.

A test cell 314 for customers or the like in a fractional factorial test group 312 may be created by selecting one treatment 208 for each control point 210. One test cell 314 may then be randomly selected for each customer or the like assigned to the fractional factorial test group 312.

Referring back to FIG. 1A, in block 114 test groups, similar to test groups 304 in FIG. 3, may be selected for the matrix, such as the test matrix 302. Multiple and completely independent experiments or test groups may be run concurrently, as previously discussed. One matrix may be in use or active at a time for each segment and channel pair. Different matrices may be active concurrently for different channel and segment pairs. A matrix may be defined by a name, description, segment, channel, associated test groups and defining transitions that map how customers move from specific test groups in a prior matrix to test groups in a new matrix as will be described with respect to FIGS. 4A and 4B.

In block 116, the treatments may be applied to the control points and in block 118, data related to customers' or others' interaction or reaction to each of the treatments may be collected. In block 120, the collected data may be accessed. The data may be accessed via a browser or the like over a network, such as the Internet, intranet or the like, as described in more detail hereinbelow. In block 122, the different treatments applied to the different segments and customers or others via the different channels may be analyzed. In block 124, results 125 of the analysis may be presented. The results 125 may be reports, charts or graphs that may illustrate behavior or actions taken by customers or the like. For example, which customers may have purchased a product or service, changed a level of service, made inquiries regarding a product or service or the like. A margin or level of success of the treatments applied may be evaluated in block 126 and adjustments to practices or operations may be made in response to the evaluation in block 128. For example, a business may decide to universally apply a particular format or treatment to its web pages and other customer contacts or channels based on interactions or reactions from treatments applied to the different channels.

Figure 4A:
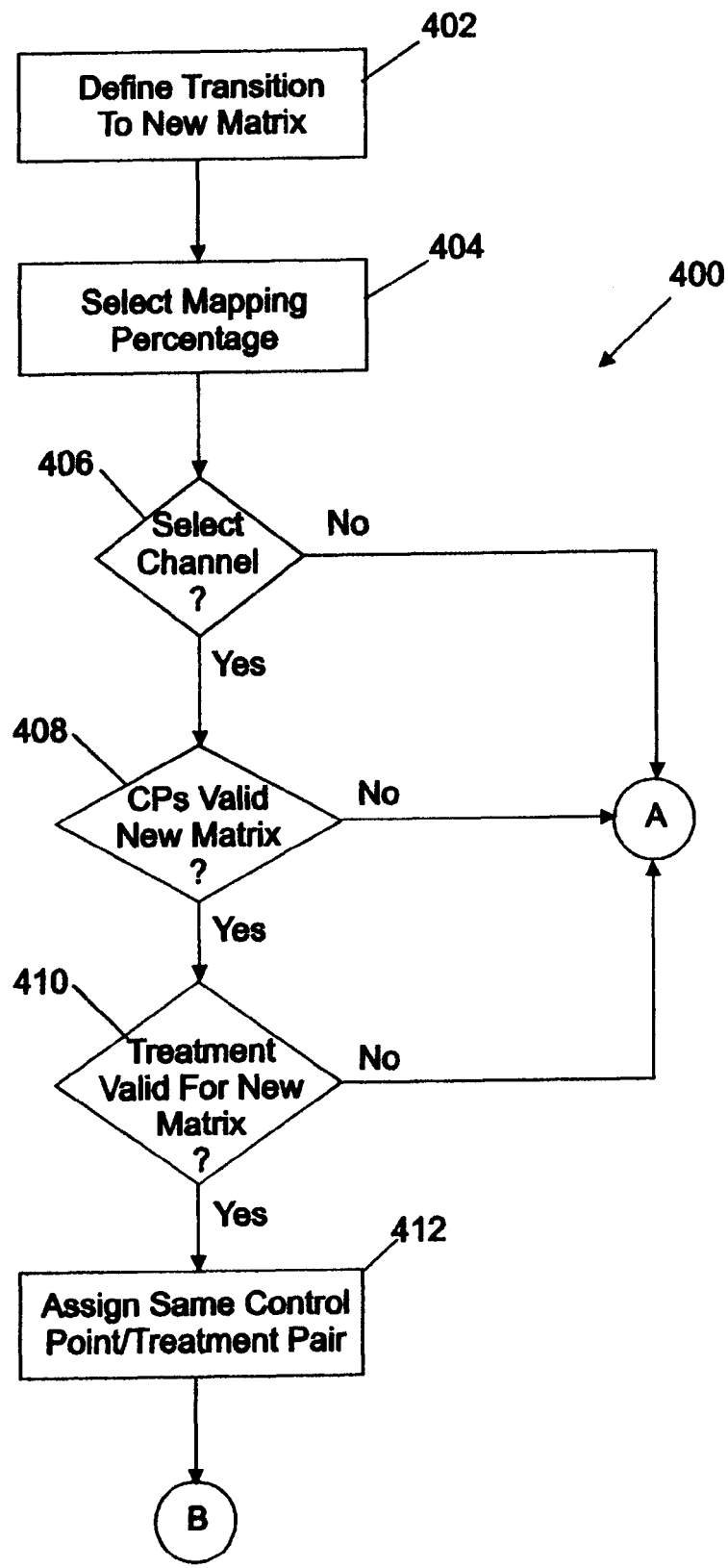
FIGS. 4A and 4B (collectively FIG. 4) are a flow chart of an exemplary method to transition to a new matrix in accordance with an embodiment of the present invention.
Figure 4B:
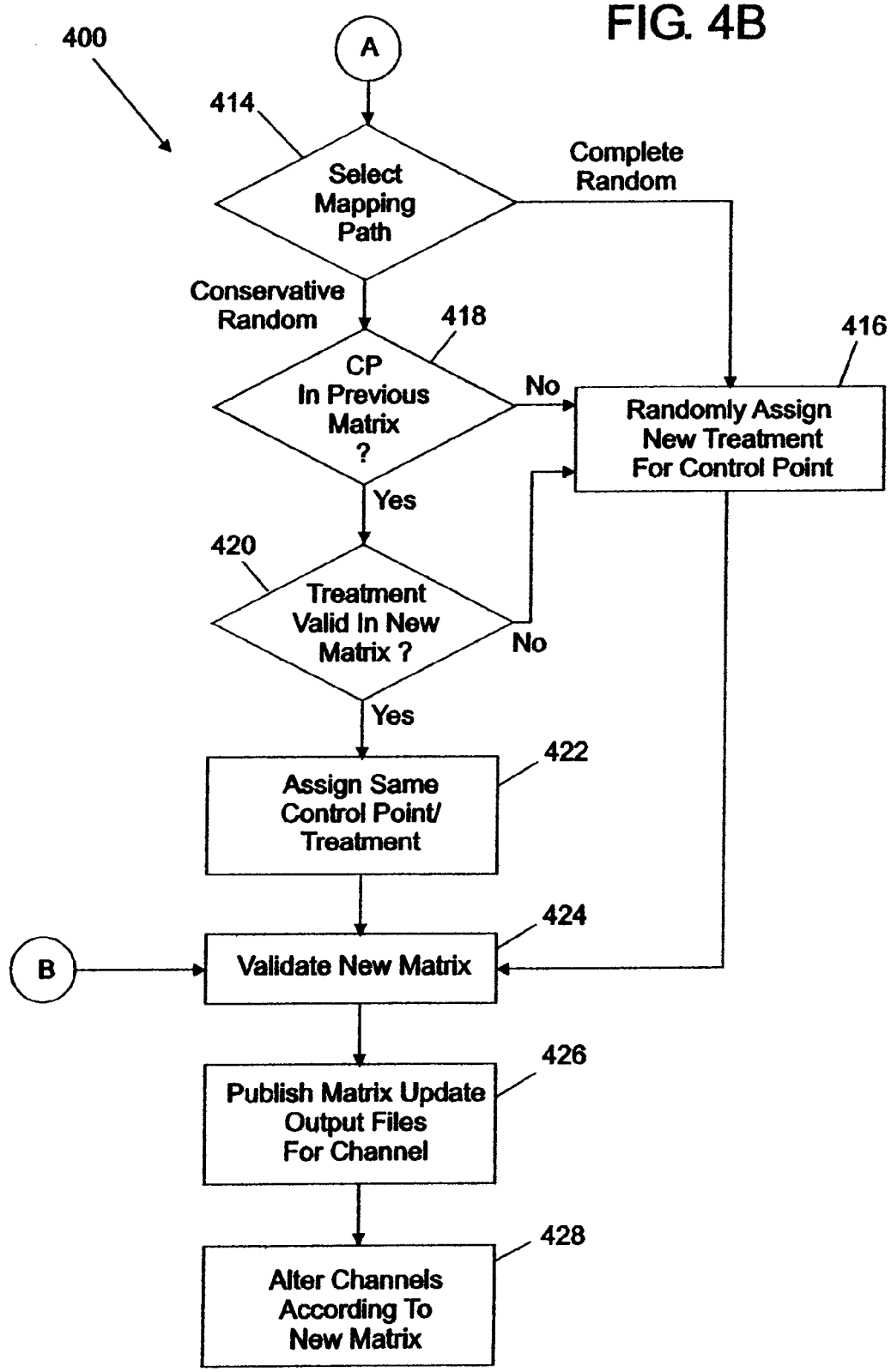
Figure 6A:
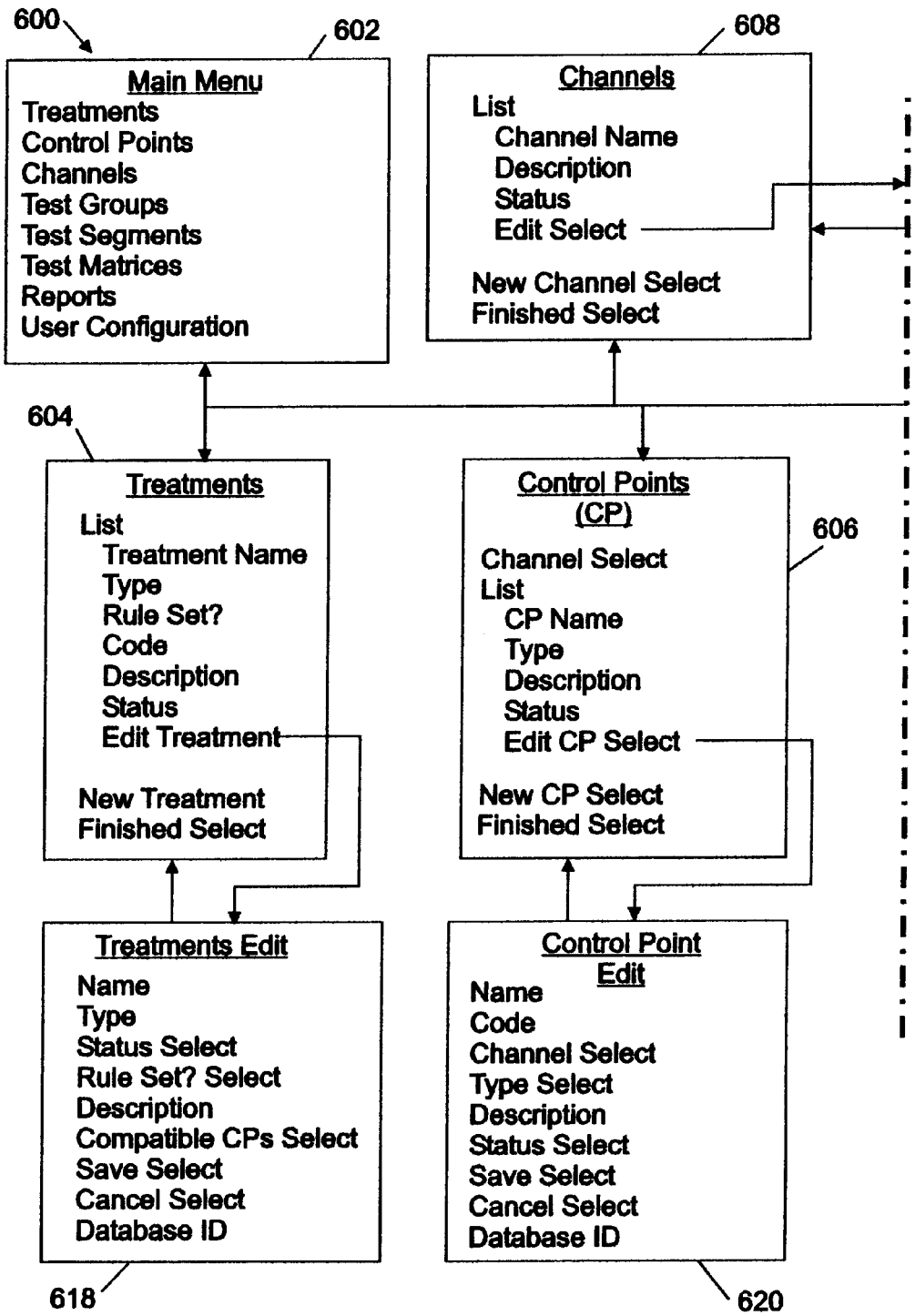
Figure 6C:
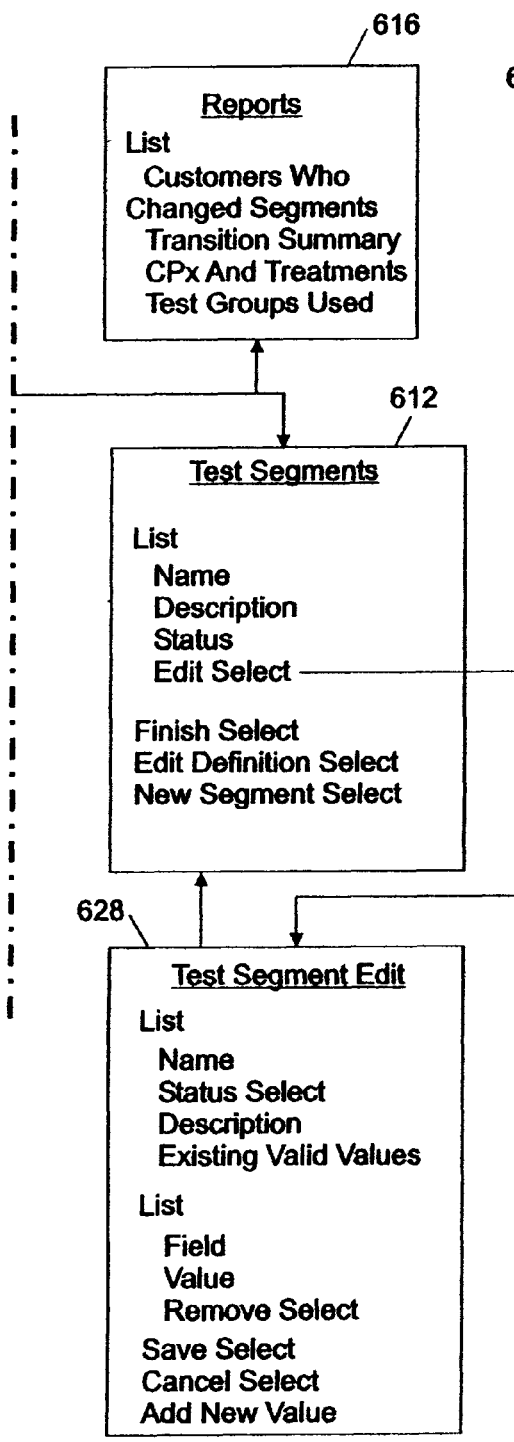
Figure 6D:
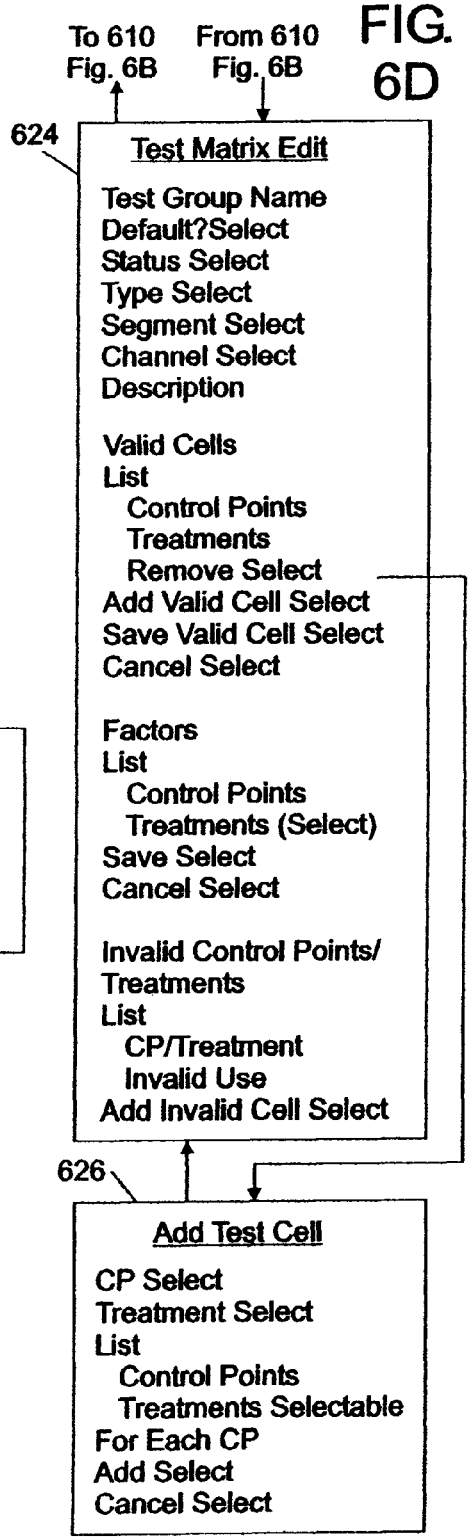

FIGS. 4A and 4B are a flow chart of an exemplary method 400 that may be used to transition from a previous or current matrix to a new matrix in accordance with an embodiment of the present invention. Referring also to FIG. 5, FIG. 5 is an example of a graphical user interface (GUI) 500 or the like that may be used to define transition parameters to transition from a previous matrix to a new matrix in accordance with an embodiment of the present invention. In block 402 (FIG. 4A), a transition to a new matrix may be defined. In block 404, a mapping percentage may be selected by a user to map each test group in a previous matrix to a test group in a new matrix. In the example of FIG. 5, the previous matrix may include test groups, X, Y and Z and a default test group. The new matrix may include test groups A, B and C. A mapping percentage 502 may be entered by a user for each test group of the current or previous matrix to be mapped to a test group in the new matrix. In the example of FIG. 5, 50% of test group X will be mapped to test group A of the new matrix, 30% of test group X will be mapped to test group B of the new matrix and 20% of test group X will be mapped to test group C of the new matrix. Similarly, percentages may be selected for each of test groups Y and Z and the default test group to map their treatments to the respective test groups A, B and C of the new matrix.

In block 406 (FIG. 4A), a channel 506 (FIG. 5) may also be selected for each new test group in the new test matrix. If a channel is not selected by a user, the method 400 may advance to block 414 (FIG. 4B) and random logic may be applied to the transition as described below. If a user selects a channel, the method 400 may check the control points in the current matrix to determine if they are also valid in the specified channel in block 408. If the control points are valid for the specified channel, a check may be done to determine what treatment the customer was assigned for the control point in the new matrix for the specified channel and same segment as the current or previous matrix. If the treatment still exists and is valid for the new matrix in block 410, the method 400 may advance to block 412 and the same control point and treatment pair may then be assigned. Otherwise, the method 400 may advance to block 414 and perform conservative or complete random logic.

In defining the transition, mapping paths may be selected for each test group from the previous test group in block 414 (FIG. 4B). FIG. 5 illustrates an example of selecting mapping paths 508. The mapping path defines a logic that may be used when transitioning customers or the like from one test group to another. A user may select a conservation random or complete random mapping path. When complete random logic is selected in block 414, the method 400 may advance to block 416 where a new treatment may be assigned to a control point without regard to the previous treatment assigned the control point. When conservative random logic is selected in block 414, the method 400 checks to determine if a particular control point for the current matrix existed in the previous matrix for the same segment and channel in block 418. If the control point did exist in the previous matrix, a check may be performed to determine if the treatment for the control point in the previous matrix is still valid in the new matrix in block 420. If the control point is valid, the same control point and treatment pair may be assigned to the customer in the new matrix in block 422. If the control point is no longer valid, the method 400 may advance to block 416 and a new treatment may be randomly assigned for the control point for the customer in the new matrix.

After assigning the control points and treatments in blocks 412, 416 or 422, and the new matrix formed, the new matrix may be validated in block 424. The matrix may be validated by ensuring the integrity of all information contained in the matrix and that only logically correct information is associated with the final matrix. The validation may confirm that all elements needed for transition have been defined between the previous and new matrix.

After the new matrix has been successfully validated, the matrix may be published in block 426. Publishing the new matrix may make the information in the matrix available for use with the channels. When a user indicates that a matrix may be published, the application may update the output files containing the customer ID along with all of the control points and treatments each customer may receive on the channel. Accordingly, in block 428 the channels may be altered according to the information in the new matrix. The files may be used to manage a customer's contact experience on a channel.

FIGS. 6A, 6B, 6C, 6D and 6E (collectively referred to as FIG. 6) are a flow chart 600 illustrating examples of web pages or graphical user interfaces (GUIs) to apply treatments or to test treatments applicable to different channels in accordance with an embodiment of the present invention. GUI 602 may be a main menu with links to other pages or GUIs to control operation of the method or application to apply different treatments to the different channels, such as methods 100 and 400 of FIGS. 1 and 4 respectively. Links from the main menu GUI 602 may include a treatments GUI 604, a control points GUI 606, a channels GUI 608, a test group GUI 610, a test segments GUI 612, a test matrices GUI 614, a reports GUI 616 and a user configuration GUI (not shown in FIG. 6). The GUIs may be generated by an application, such as a Test Control System (TCS) Application operating on a data processing device, such as a server or the like as will be described in more detail with respect to FIG. 7.

The treatments GUI 604 may list the different treatments available in a system for selection by a user. Information about each treatment may include the name of the treatment, the type treatment (content or attribute), whether the treatment is flagged as a rule set, a description of the treatment, status of the treatment (active or inactive). A button or the like may be associated with each treatment to permit the treatment to be edited. A new treatment may also be defined and a user may select finished when completed defining new treatments or editing existing treatments.

If edit treatment is selected, a treatments edit GUI 618 or page may be presented to a user. The edit treatment GUI 618 may permit a user to edit the name, type, status, rule set and description. The user may also select control points that are compatible with the treatments. A feature for the user to select to save the modifications, such as a save button or the like, may be provided and a cancel feature.

The control points (CP) GUI 606 or page may include a channel select feature to select different available channels from a drop down list or the like. A list of control points for the selected channel may then be listed including the control point name, type (content or attribute), description, status (active or inactive). Each control point may include an edit select feature for editing the control point information for the control point associated with the edit select feature. If the edit select feature is selected by a user, a control point edit GUI 620 may be presented to the user. The control point edit GUI 620 may permit the name, code, channel selected, type selected, description and status to be changed. A database ID for the control point may be displayed on the edit page. Save and cancel select button or the like may be provided to save or cancel the changes made to the control point.

The channels GUI 608 may include a list of available channels by name, description, status and an edit select feature, such as an edit button or the like. If the edit button is selected, a channel edit GUI 622 may be presented to a user. In the channel edit GUI 622, the channel name and description may be changed and a channel status, active or inactive, may be selected. Buttons to save or cancel the changes to the channel information may be provided.

The test groups GUI 610 may include a channel select feature, such as a drop down list or the like, of available channels. Test groups associated with the selected channel may be listed including the test group name, type (factorial, predictive or fractional), description, an identification of the associated segment, status of the test group (active or inactive) and a edit select feature, such as a button or the like. If the edit feature is selected by a user, a test group edit GUI 624 (FIG. 6D) or page may be presented to a user. The test group edit GUI 624 may permit the test group name to be edited. The test group may be selected as a default test group. The status, type, segment and channel may be selected and the description may be edited. The test group edit GUI 624 may also list valid cells including control points and associated treatments. Add valid cell, save valid cell and cancel selection features may also be available. The test group edit GUI 624 may also list control points and treatments associated with each control point for selection of the treatments to be applied to each control point. A list of invalid control points may also be presented to a user. If an add test cell select feature is operated, an add test cell GUI 626 may be presented to a user. The add test cell GUI 626 may include a control point select feature and an associated treatment select feature. A list of control points and selectable treatments associated with each control point may be presented to a user.

A test segments GUI 612 may include a list of test segments by name, description, status (active or inactive). An edit select feature or button may be associated with each listed segment. A test segment edit GUI 628 may be presented to a user to edit a name, select a different status and edit a description. Existing valid values associated with each test segment may be listed by field and value. A remove select feature or button may be associated with each field and value.

The test matrices GUI 614 or page may include a channel select feature for a user to select a channel. A list of test matrices for the channel may be listed in response to selecting the channel. The test matrices information may include name, status, description, start date, and segment for each test matrix. An edit select feature may be associated with each test matrix. A test matrix edit GUI 630 may be presented to a user in response activating the edit select feature. The test matrix edit GUI 630 may permit the following test matrix information to be edited: test matrix name, start date, segment select, channel select, status, whether the matrix has been validated and a description. A list of test groups associated with a matrix may also be listed including name, type (factorial, fractional, predictive), default designation and description. A remove select feature may be provided to permit removal of the test group from the matrix. The test matrix edit GUI 630 may also include an add test group select feature. An add test group(s) GUI 632 or page may be presented to user in response to selecting the add test group(s). The add test groups GUI 632 may list test groups including information for each test group, such as test group name, type and description. An add select feature may be provided to permit a test group to be selected to add to a matrix.

The test matrix edit GUI 630 may also include a transition section. The transition section may present a list including the previous matrix, previous groups associated with the matrix, test groups in the new matrix, weight or percentage of previous test group in each new test group and a mapping path for the transition from the previous to the new matrix.

The transition section may also include a create transition select feature. A test matrix transition GUI 634 may be presented in response to a user selecting the create transition feature. The test matrix transition GUI 634 may include a list of test groups in the previous matrix, a mapping select feature, a mapping path select feature and a channel select feature. The test matrix transition GUI 634 may be similar to the GUI 500 described with respect to FIG. 5. The mapping select feature may permit a user to select a percentage of each test group in the previous matrix to be mapped to a test group in the new matrix. The mapping path may permit a user to select a complete random or conservative random mapping path as previously described.

The test matrix edit GUI 630 may also include a validate select feature and a publish select feature to valid and publish the new matrix. The validate select and publish select features may each be a button or the like.

FIGS. 7A, 7B and 7C (referred to collectively as FIG. 7) are an example of a system 700 to apply treatments 702 to different channels 716 or to test treatments 702 in accordance with an embodiment of the present invention. The methods 100 (FIG. 1) and 400 (FIG. 4) previously described may be embodied in a test control system (TCS) application 704 that may operate on a data processing device 706. The data processing device 706 may be a server, such as an Internet type server or the like. The TCS application 704 may also include data structures to generate the GUIs or web pages 602-634 described with respect to FIG. 6 and the operations described in association therewith.

The TCS application 704 may be accessed by one or more users or clients 708 via a communication medium 710 using a browser 712 or the like. The medium 710 may be a network, such as the Internet, private network or the like. In other embodiments, the communication medium 710 may be any communication system including by way of example, dedicated communication lines, telephone networks, wireless data transmission systems, two-way cable systems, customized computer networks, interactive kiosk networks and the like. The browser 712 may operate on a processor 714. The browser 712 may be an Internet type browser such as Netscape® Microsoft® Internet Explorer or the like. The browser 712 may present information, such as the GUIs 602-634 (FIG. 6) or the like, related to the TCS application 704 and applying different treatments 702 to different channels 716 of communication or contact with customers 718 or others. The information or GUIs 602-634 may be displayed or presented to a user on an output device 720 or devices. The output device 720 or devices may be a display or monitor, printer or similar device. The user may control operation of the TCS application 704 by entering data or information into one or more input devices 722. The input devices 722 may be a keyboard, pointing device, such as a mouse, voice recognition algorithm or apparatus or the like. Accordingly, a user may input data or information, such as into the GUIs 602-634 as described with respect to FIG. 6 or the like, to define segments, treatments, control points, test groups, matrices, select channels and the like as described with respect to FIGS. 1A and 1B. A user may also access collected data and present results or reports as described with respect to FIGS. 1A and 1B and FIG. 6. A user may also use the output devices 720 and input devices 722 to define a transition to a new matrix as described with respect to FIG. 4 and to display GUIs, such as test matrix transition GUI 634 (FIG. 6) for a user to enter parameters to define the transition.

As previously described, treatments 702 may be content items 724 or attribute values 726. A content item 724 may be directly applied to a control point 728 of an associated channel or channels 716. An attribute value 726 may be used by some criteria, algorithm, logic statement of the like to select a content to be applied at the control point 728 of an associated channel or channels 716. As previously described, a treatment 702 may also be flagged as a rule set 730. A treatment that is flagged as a rule set 730 may identify a specific conditional logic statement that may be executed to identify the content item or attribute value that may be applied to the control point 728. A rules engine 732 may be provided to perform or implement an algorithm, logic statement or the like associated with an attribute value 726 or rule set 730. An example of an algorithm or conditional logic statement associated with an attribute value 726 or rule set 730 may be that if a predetermined condition exists, event occurs or the like, then some predetermined content may be selected and applied to the control point 728 for the associated channel or channels 716.

The different content item 724 and attribute value 726 treatments and associated rule sets 730 may be predefined, as previously discussed, and stored in a data source 734 or the like. Historical information about which treatments were applied to what control points 728 and channels 716 and to which customers 718, members or the like or segments 736, may be stored in a data warehouse 738 or similar large capacity data storage medium. Results of application of the different treatments 702 may also be stored in the data warehouse 738 or other data storage medium for access by a user or client 708.

As previously described, the different treatments 702 may be applied at a control point 728 associated with each channel or channels 716. The control point 728 may be a location or point of access to an audio, visual or combination audio-visual feature of a channel 716 where the feature may be modified by the treatment to present a different look and feel or experience when a customer 718 or other person accesses the channel 716 via some medium 740 illustrated by the dashed or broken line in FIG. 7. A control point 728 may be associated with one or more channels 716 to apply a common treatment across multiple channels 716. Examples of different channels 716 may include a web site 716a, e-mail 716b, ATM 716c and other channels 716d or means of contact with customers 718 or others. The medium 740 may be a network, such as the Internet or a private network. Examples of the medium 740 may also include without limitation any communication system including by way of example, dedicated communication lines, telephone networks, wireless data transmission systems, two-way cable systems, customized computer networks, interactive kiosk networks and the like.

As previously described, the customers 718, members or the like may be divided into segments 736 by some criteria. The treatments 702 may then be applied to the channels 716 according to selected segments 736.

Elements of the present invention may be embodied in hardware and/or software as a computer program code that may include firmware, resident software, microcode or the like. Additionally, elements of the invention, such as method 100 of FIG. 1, method 400 of FIG. 4 and the data structures to create and present the GUIs or web pages described with respect to FIG. 6, may take the form of computer program products. The computer program products may be embodied on a computer-usable or computer-readable storage medium having computer-usable or computer-readable program code for use by or in connection with a system, such as system 700 of FIG. 7 or the data processing devices or systems used in the system 700. Examples of such a medium may be illustrated in FIG. 7 as input devices 722, mediums 710 and 740, data source 734 or data warehouse 738 or similar devices. A computer-readable medium may be any tangible medium that may contain or store the program for use by or in connection with a system, such as system 700. The medium, for example, may be an electronic, magnetic, optical, electromagnetic, or semiconductor system or the like.

Although specific embodiments have been illustrated and described herein, those of ordinary skill in the art appreciate that any arrangement which is calculated to achieve the same purpose may be substituted for the specific embodiments shown and that the invention has other applications in other environments. For example, the systems and methods of the present invention may have been described for use in testing different treatments applied to different channels; however, the methods and systems may be used for any purpose in which applying different treatments to different channels may be useful. This application is intended to cover any adaptations or variations of the present invention. The following claims are in no way intended to limit the scope of the invention to the specific embodiments described herein.

What is claimed is:

1. A method to apply different treatments, comprising:
defining a plurality of different treatments, each of the plurality of different treatments being different from each other;
selecting a plurality of different channels, each of the plurality of different channels being different from each other, and wherein each of the channels comprises a specific medium of communication, at least one medium of communication comprising a non-webpage medium;
applying, by a computing device, the plurality of different treatments to the plurality of different selected channels such that each different selected channel has a different treatment applied thereto and associated therewith so as to evaluate the impact that each different treatment has to each different, selected channel;
defining at least one matrix, each matrix comprising a plurality of test groups wherein each test group includes a plurality of test cells, wherein each test cell includes at least one control point and at least one treatment associated with each control point; and
defining a transition from the at least one matrix to a new matrix, wherein the defining a transition to a new matrix comprises:
selecting, by the computing device, a percentage of each test group in a previous matrix to be associated with each test group in the new matrix; and
selecting, by the computing device, a mapping path for each test group in the previous at least one matrix.

2. The method of claim 1, wherein defining the plurality of different treatments comprises defining one of a content treatment and an auxiliary content treatment.

3. The method of claim 2, wherein applying the auxiliary content treatment comprises applying a predetermined treatment in response to a conditional logic statement.

4. The method of claim 2, wherein the content treatment or the auxiliary content treatment is applied according to a conditional logic statement in response to the treatment being flagged as a rule set.

5. The method of claim 1, further comprising applying the plurality of different treatments to a control point associated with each selected channel.

6. The method of claim 1, wherein the plurality of channels comprises a combination of two or more of a web site, an e-mail, an automatic teller (ATM) screen, an on-hold telephone message, direct mailing, outbound telemarketing, and marketing a product or service.

7. The method of claim 1, further comprising validating the new matrix.

8. The method of claim 7, further comprising updating output files for each channel according to the new matrix.

9. The method of claim 8, further comprising altering the channels in response to new treatments associated with the new matrix.

10. The method of claim 1, further comprising:
accessing historical data related to treatments applied to different customers and segments of customers stored in a data source;
evaluating a margin of success or failure of each treatment applied to different segments and customers via different channels; and
adjusting practices or operations based on results of the evaluation.

11. The method of claim 1, further comprising testing an effect of the application of the plurality of different treatments to the plurality of channels.

12. The method of claim 1, wherein one of the plurality of different channels comprises direct mail.

13. A method to apply different treatments, comprising:
accessing historical data related to treatments from a data source;
evaluating, by a computing device, a margin of success or failure of a plurality of different treatments applied to different segments via different channels so as to evaluate the impact that each different treatment has to each different channel, wherein each of the plurality of different treatments are different from each other, wherein the different channels comprise a plurality of different channels, each of the plurality of different channels being different from each other, and wherein each of the plurality of different channels comprises a specific medium of communication; and
adjusting practices or operations based on results of the evaluation;
defining at least one matrix, each matrix comprising a plurality of test groups wherein each test group includes a plurality of test cells, wherein each test cell includes at least one control point and at least one treatment associated with each control point; and
defining a transition from the at least one matrix to a new matrix, wherein the defining a transition to a new matrix comprises:
selecting, by the computing device, a percentage of each test group in a previous matrix to be associated with each test group in the new matrix; and
selecting, by the computing device, a mapping path for each test group in the at least one matrix.

14. The method of claim 13, further comprising applying at least one treatment to at least one selected channel.

15. The method of claim 14, wherein the plurality of channels comprises a combination of two or more of a web site, an e-mail, an automatic teller (ATM) screen, an on-hold telephone message, direct mailing, outbound telemarketing, and marketing a product or service.

16. The method of claim 14, wherein the applying at least one treatment to the at least one selected channel comprises applying the at least one treatment to a control point associated with the at least one selected channel.

17. The method of claim 13, further comprising selecting at least one test cell including at least one control point and at least one treatment associated with each control point.

18. The method of claim 16, further comprising defining a plurality of test groups each comprising a plurality of test cells.

19. The method of claim 18, further comprising defining at least one matrix, each matrix including selected test groups of the plurality of test groups.

20. A system to apply different treatments, comprising:
a server; and
a test control system operating on the server to apply a plurality of treatments to a plurality of different channels,
wherein each of the plurality of treatments are different from each other,
wherein each channel chosen from the plurality of different channels comprises a specific medium of communication, and
wherein the plurality of different treatments are applied to each chosen channel so as to evaluate the impact that each different treatment has on the chosen channels;
defining at least one matrix, each matrix comprising a plurality of test groups wherein each test group includes a plurality of test cells, wherein each test cell includes at least one control point and at least one treatment associated with each control point; and
defining a transition from the at least one matrix to a new matrix, wherein the defining a transition to a new matrix comprises:
selecting a percentage of each test group in a previous matrix to be associated with each test group in the new matrix; and
selecting a mapping path for each test group in the at least one matrix.

21. The system of claim 20, further comprising a storage device to store the plurality of treatments.

22. The system of claim 20, further comprising a storage device to store historical data related to the selected treatments applied to each chosen channel.

23. The system of claim 20, wherein each treatment comprises one of a content treatment and an auxiliary content treatment.

24. The system of claim 23, wherein the auxiliary content treatment comprises a predetermined treatment applicable to the chosen channel in response to a conditional logic statement.

25. The system of claim 20, wherein a treatment flagged as a rule set is applicable to the chosen channel in response to a conditional statement associated with the rule set.

26. The system of claim 20, wherein the chosen channel comprises at least one of a web site, e-mail, automatic teller (ATM), on-hold message system, electronic kiosk, outbound telemarketing system direct mailing, marketing a product or service.

27. The system of claim 20, further comprising at least one test cell defining at least one control point associated with each chosen channel and at least one treatment associated with each control point.

28. The system of claim 27, wherein the test control system comprises a display device configured to present a treatment graphical user interface (GUI) to a user via a browser to create and edit selected treatments and to select control points associated with each treatment.

29. The system of claim 27 wherein the test control system comprises a display device configured to present a control point GUI to a user via a browser to create and edit control points.

30. The system of claim 27, wherein the test control system comprises a display device configured to present a test cell GUI to a user via a browser to create test cells and select treatments to be associated with each test cell.

31. The system of claim 27, further comprising at least one test group including selected ones of a plurality of test cells.

32. The system of claim 28, wherein the test control system comprises a display device configure to present a test groups GUI to a user via a browser to define and edit each test group.

33. The system of claim 31, further comprising at least one test matrix including selected ones of a plurality of test groups.

34. The system of claim 33, wherein the test control system comprises a display device configured to present a test matrix GUI to a user via a browser to create and edit the test matrices.

35. The system of claim 34, wherein the test control system comprises a display device configured to present a test groups selection GUI to the user via a browser to select test groups to be associated with each test matrix.

36. The system of claim 34, wherein the test control system comprises a display device configured to present a test matrix transition GUI to a user via a browser to select percentages of each test group of a prior test matrix to be transferred to each test group of a new test matrix and to select a mapping path for each test group and a channel to be associated with each test group.

37. The system of claim 20, further comprising a control point to apply each treatment to the chosen ones of the plurality of channels.

38. The system of claim 20, further comprising a processing device configured to generate a report of all customers changing segments.

39. A non-transitory computer-readable medium having computer-executable instructions for performing a method when executed on a computer, the method comprising:

defining a plurality of different treatments, each of the plurality of different treatments being different from each other;

selecting a plurality of different channels, each of the plurality of different channels being different from each other, and wherein each of the channels comprises a specific medium of communication, at least one medium of communication comprising a non-webpage medium;

applying the plurality of different treatments to the plurality of different selected channels such that each different selected channel has a different treatment applied thereto and associated therewith so as to evaluate the impact that each different treatment has to each different, selected channel;

defining at least one matrix, each matrix comprising a plurality of test groups wherein each test group includes a plurality of test cells, wherein each test cell includes at least one control point and at least one treatment associated with each control point; and defining a transition from one matrix to a new matrix, wherein the defining a transition to a new matrix comprises:

selecting a percentage of each test group in a previous matrix to be associated with each test group in the new matrix; and selecting a mapping path for each test group in the previous matrix.

40. The non-transitory computer- readable medium having computer-executable instructions for performing the method of claim 39, further comprising applying the plurality of different treatments to a control point associated with each selected channel.

41. The non-transitory computer-readable medium having computer-executable instructions for performing the method of claim 39, wherein the plurality of channels comprises a combination of two or more of a web site, an e-mail, an automatic teller (ATM) screen, an on-hold telephone message, direct mailing, outbound telemarketing, and marketing a product or service.

* * * * *